(12) United States Patent
Johnsen

(10) Patent No.: US 6,727,609 B2
(45) Date of Patent: Apr. 27, 2004

(54) COOLING OF A ROTOR FOR A ROTARY ELECTRIC MACHINE

(75) Inventor: Tyrone A. Johnsen, Rockford, IL (US)

(73) Assignee: Hamilton Sundstrand Corporation, Rockford, IL (US)

(*) Notice: Subject to any disclaimer, the term of this patent is extended or adjusted under 35 U.S.C. 154(b) by 51 days.

(21) Appl. No.: 09/924,976

(22) Filed: Aug. 8, 2001

(65) Prior Publication Data

US 2003/0030333 A1 Feb. 13, 2003

(51) Int. Cl.[7] .................................................. H02K 9/00
(52) U.S. Cl. ........................... 310/52; 310/54; 310/55; 310/58; 310/60 A; 310/61
(58) Field of Search .......................... 310/52, 54, 55, 310/58, 60 R, 61

(56) References Cited

U.S. PATENT DOCUMENTS

| | | | | |
|---|---|---|---|---|
| 397,340 A | * | 2/1889 | Richards | 310/265 |
| 422,863 A | * | 3/1890 | Collins | 310/265 |
| 527,050 A | * | 10/1894 | Washburn | 219/628 |
| 890,577 A | * | 6/1908 | Cohen | 310/65 |
| 4,301,386 A | * | 11/1981 | Schweder et al. | 310/59 |
| 5,859,483 A | * | 1/1999 | Kliman et al. | 310/58 |
| 6,107,709 A | * | 8/2000 | Cooper | 310/61 |
| 6,201,331 B1 | | 3/2001 | Nakano | 310/114 |
| 6,211,597 B1 | | 4/2001 | Nakano | 310/266 |

* cited by examiner

Primary Examiner—Burton S. Mullins
Assistant Examiner—David W. Scheuermann
(74) Attorney, Agent, or Firm—Roger V. Feldman

(57) ABSTRACT

A high-power electrodynamic machine has a relatively elongated rotor. In a preferred generator embodiment, a rotor having a winding formed integral therewith is integral to a hollow shaft mounted within a stator having a plurality of windings. The shaft has an axial end region with an inlet for a cooling fluid. The rotor winding is disposed in apposition to one of the stator windings. The rotor comprises a plurality of laminations. At least one pair of adjacent laminations has periodic slots. The slotted laminations are sandwiched between laminations without slots such that the slots in the adjacent laminations form a continuous, zigzag, generally radial outward passageway for the cooling fluid. The outlet of the passageway is arranged to discharge the fluid onto the winding to provide relatively even cooling along the entire length of the rotor without significantly reducing structural integrity.

2 Claims, 3 Drawing Sheets

VIEW B-B

COOLING OF A ROTOR FOR A ROTARY ELECTRIC MACHINE

FIELD OF THE INVENTION

The invention relates generally to a rotary electric machine having a relatively elongated rotor, and more particularly to cooling the winding of the rotor of the rotary electric machine at multiple points axially.

BACKGROUND OF THE INVENTION

Rotary electric machines include generators and motors. A generator may be used to convert mechanical energy from a prime mover into electrical energy. A motor performs the opposite function. For simplicity, the discussion hereinbelow is limited primarily to generators.

Generators typically use a rotating magnetic device known as a rotor mounted within a stationary member known as a stator. The rotor is rotatably driven by a prime mover. In an aircraft, a generator may be driven by means of a main engine or an auxiliary power unit (APU) through a gearbox or a constant speed drive (CSD) transmission. The electrical energy produced by the generator illuminates the cabin, powers avionics, heats food, etc. Electrical power requirements typically are greater for newer aircraft as compared with their predecessors because more electrical devices and loads are used; in particular, flight control surfaces are increasingly being actuated by electric power rather than hydraulics.

When the need for electrical power delivered by the generator is relatively large (because more electrical devices are used in newer aircraft as compared with their predecessors), generally the rotating magnetic device is a rotor winding rather than a permanent magnet. The rotor winding becomes an electromagnet when the winding is connected to a current source, and the electromagnet produces a rotating magnetic field of sufficient intensity to generate the relatively large power in a stator winding. The rotor winding generally comprises a plurality of coils of wire, typically copper, wound around a magnetic core, typically cobalt-iron. This arrangement is commonly referred to as "poles."

Generators produce heat by several mechanisms. Generally, the largest source of heat in a generator is ohmic loss in the rotor and stator windings, that is, the heat produced by the square of the current multiplied by the winding electrical resistance (sometimes known as "copper loss"). Additional heat sources are eddy currents in the stator armature core ("iron loss"), bearing friction, and rectifier electrical loss. Generators are typically cooled by means of a fluid (e.g., liquid or a cooled gas), but the motion of the rotor through the fluid itself produces heat by windage (fluid resistance). In relatively small, high-power generators, e.g., aircraft generators, removing the heat from the windings, principally the copper loss, is a design challenge.

Designing a generator involves many tradeoffs. The diameter or the length of the rotor, or both, may be increased when comparatively greater generator output power is required. If the rotor diameter is increased beyond a certain point to increase the power output, centrifugal forces become excessive, turbulence creates excessive drag and heat in the cooling fluid, and the speed of the rotor tips may approach the speed of sound, thereby creating shock waves in the cooling fluid. On the other hand, if the rotor length is increased beyond a certain point to increase the power output, cooling the rotor at the ends only, as is generally done in the prior art, produces a thermal gradient leading to a relatively hot region in the rotor axial mid-region.

Various methods are known to cool a rotor winding. A fluid such as oil may be injected on the rotor winding, or the fluid may bathe the winding. The fluid may be injected radially or flowed axially. In a generator having a rotor and a stator in a common housing, it is usually necessary to cool both the stator winding and the rotor winding. This may be achieved by passing cooling fluid into the rotor and through the rotor winding, and simultaneously jetting fluid from outlets at either end of the rotor onto the stator end winding.

U.S. Pat. No. 5,554,898 describes such an arrangement. Ducts leading from the interior of the rotor to its periphery are provided at opposite ends of the rotor with a flow path therebetween, which passes over the rotor winding. Cooling oil is pumped into the rotor and along the flow path over the rotor winding. Centrifugal force causes the cooling oil to form an annular layer at each end of the rotor. If the rotor is elongated, the middle region axially may not be cooled adequately.

When the rotor is relatively elongated in relation to the rotor diameter, a significant problem is to maintain sufficient heat transfer by means of cooling fluid flow in regions of the rotor winding that are located comparatively far from the rotor ends to prevent those regions of the rotor winding from overheating. The present invention is specifically directed to overcoming this problem.

DISCLOSURE OF THE INVENTION

An object of this invention is to provide a rotary electric machine in which sufficient cooling is maintained at a plurality of regions axially along the rotor winding.

An additional object is to reduce hot spots in the rotor of a high-power generator.

A further object is to provide relatively even cooling along the entire length of a generator rotor without significantly reducing structural integrity.

According to the invention, a rotary electric machine comprises a stator having a plurality of windings and a hollow shaft having an axial end region. The shaft is mounted within the stator for rotation about an axis. The shaft has at least one radial orifice and an inlet for a cooling fluid in the axial end region. A rotor core is integral to and coaxial with the hollow shaft, the rotor core having at least one electromagnetic device formed integral therewith. Each electromagnetic device is disposed in apposition to one of the plurality of stator windings. A generally radial outward passageway through the rotor core has an entry for the cooling fluid at the inner diameter of the rotor core, the entry being aligned with one of the shaft radial orifices. The passageway has an outlet arranged to discharge the cooling fluid onto at least one of the electromagnetic devices.

According to another aspect of the invention, the rotor core further comprises a plurality of laminations, at least one pair of adjacent laminations having periodic slots, wherein the pair of adjacent laminations is sandwiched between a pair of laminations without slots, such that the slots in the adjacent laminations form a continuous, zigzag, generally radial outward passageway.

According to still another aspect of the invention, the pair of adjacent laminations further comprises two laminations having an identical pattern of slots, the two laminations being rotated a number of degrees from each other.

The invention has the benefit that it uses a portion of the flow of the cooling fluid to cool multiple points along the rotor without using openings in the rotor that may weaken the rotor or be prone to clog with contaminants in the cooling fluid.

The above and other objects, features, and advantages of this invention will become apparent when the following description is read in conjunction with the accompanying drawings.

DETAILED DESCRIPTION OF THE PREFERRED EMBODIMENTS

Figure 1:
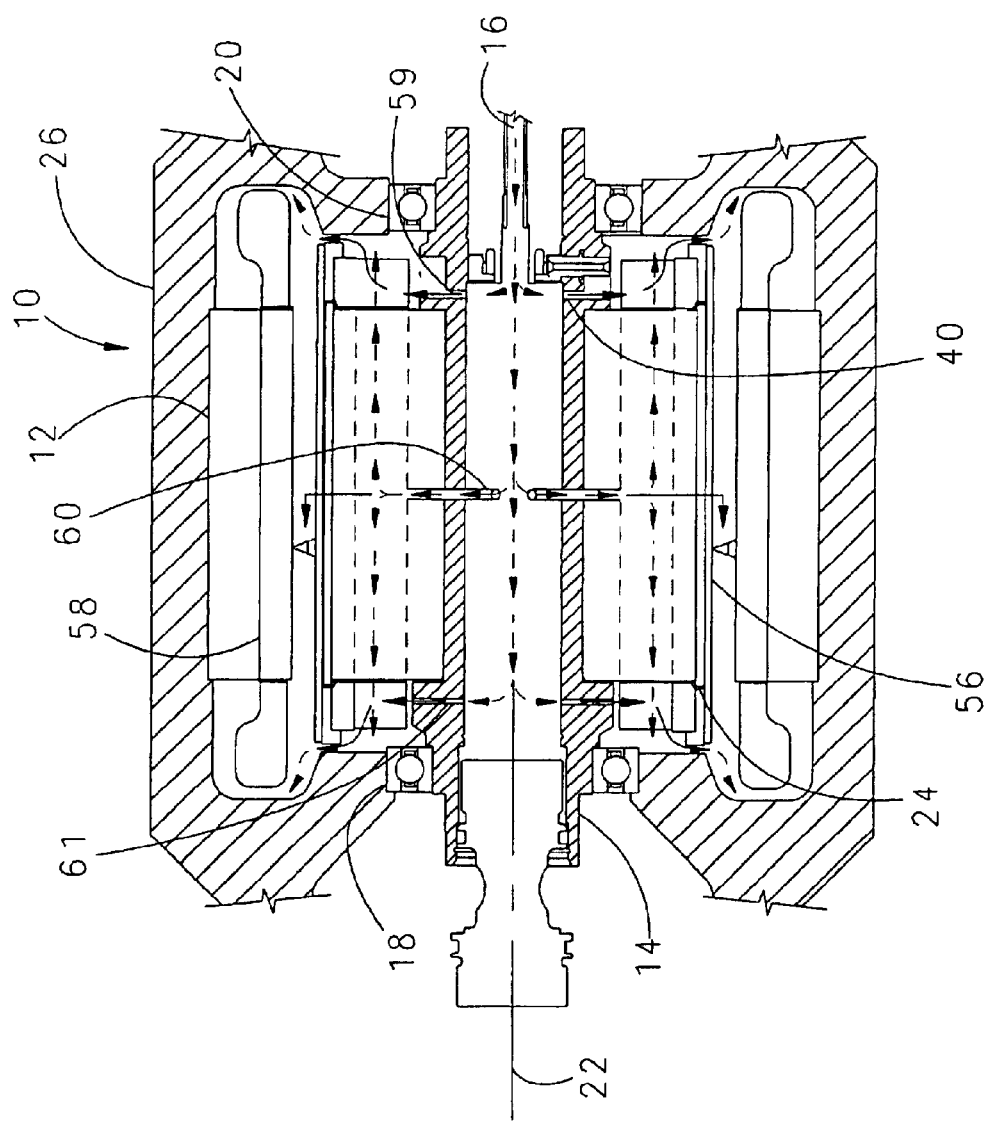
FIG. 1 is a longitudinal cross-sectional view of a generator in accordance with the present invention.

Referring to FIG. 1, a rotary electric machine 10 comprises a stator 12 and a hollow shaft 14 having a fluid inlet 16. The shaft 14 is mounted within the stator 12 on bearings 18, 20 for rotation about the shaft axis 22. An elongated rotor core 24 surrounds and is coaxial with the shaft 14. A housing 26 surrounds the shaft 14, the stator 12, and the rotor core 24. In an embodiment as an aircraft generator, the machine 10 may be driven by a main engine or an APU through a gearbox or a CSD transmission, and the electrical energy produced by the generator may power various loads on the aircraft.

Figure 2:
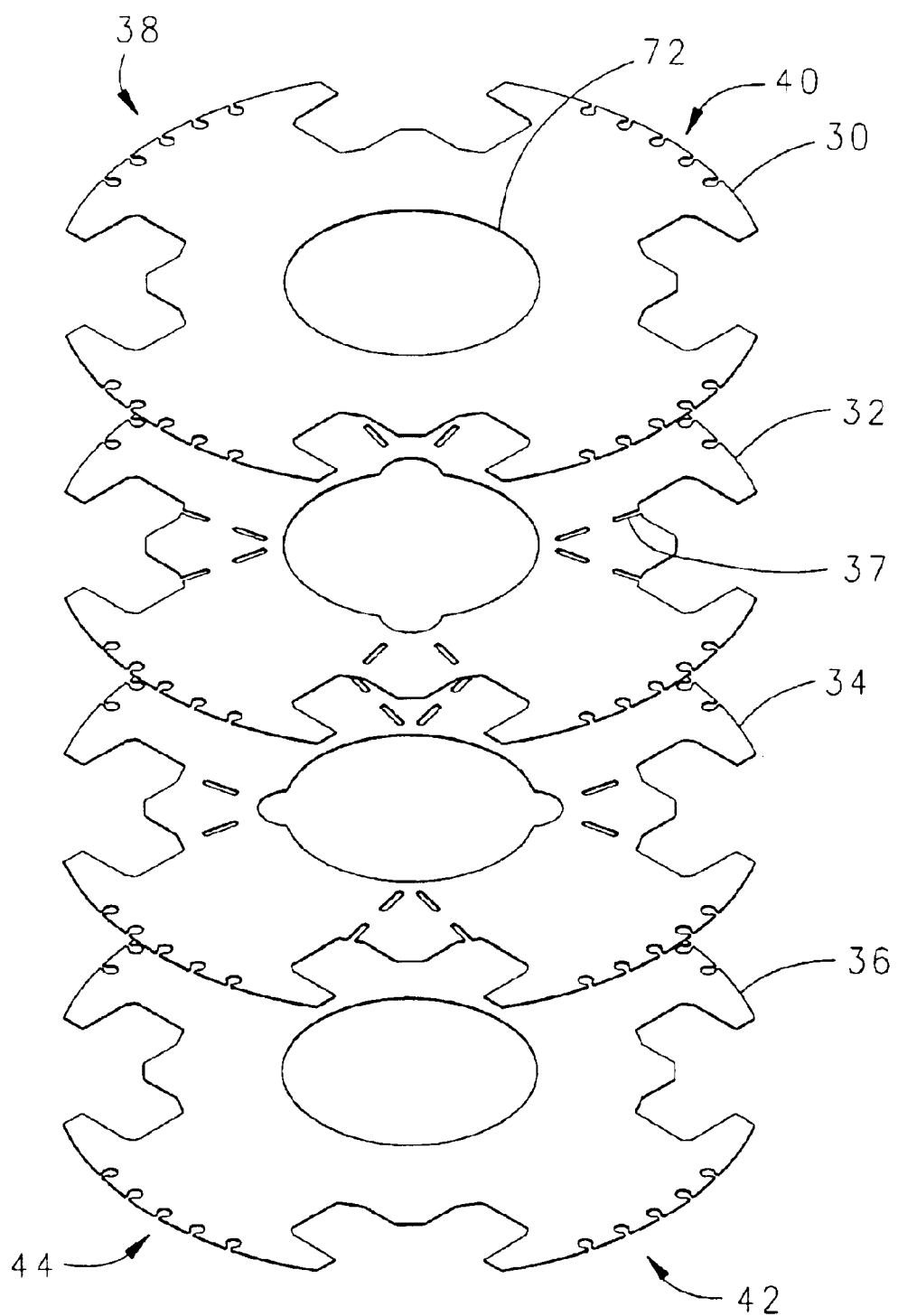
FIG. 2 is an isometric exploded view of four laminations of the rotor of the generator of FIG. 1.

As is illustrated in FIG. 2, the rotor core 24 comprises a plurality of magnetic, generally disk-shaped laminations 30, 32, 34, 36 arranged together back-to-back in a stack configuration. The laminations are typically made of ferromagnetic material, preferably an iron-cobalt alloy. The laminations are relatively thin, preferably approximately 10 to 20 thousands of an inch thick. In an exemplary embodiment, a majority of the laminations in the rotor core is unperforated laminations 30, 36 bonded together by a process selected from the exemplary group consisting of edge welding, adhesive bonding, and mechanical fastening. In another embodiment, this solid portion of the rotor core 24 is made of cylinder of ferromagnetic material. An embodiment of the rotor core 24 is illustrated that has four pole locations 38, 40, 42, 44 for exemplary purposes. The invention is not limited to a four-pole embodiment: any number of poles may be used on the rotor core 24.

In one or more locations on the rotor core 24, perforated laminations 32, 34 are sandwiched between unperforated laminations 30, 36. Laminations 32, 34 are perforated with the same pattern of periodic slots 37; none of the slots traverses the entire radius. Between pole locations 40, 42 on lamination 32, two slots extend radially outward. Between pole locations 42, 44 on lamination 32, one slot extends radially outward. These numbers of slots, one or two, are exemplary. The laminations 32, 34 are rotated a number of degrees from each other, in this case, 90 degrees, or one pole location. If a six-pole rotor were used, the laminations would be rotated 60 degrees, and so forth. The slots 37 in the laminations 32, 34 are alternated such that when the laminations are sandwiched together, the slots form a continuous, generally radial outward passageway.

Figure 3:
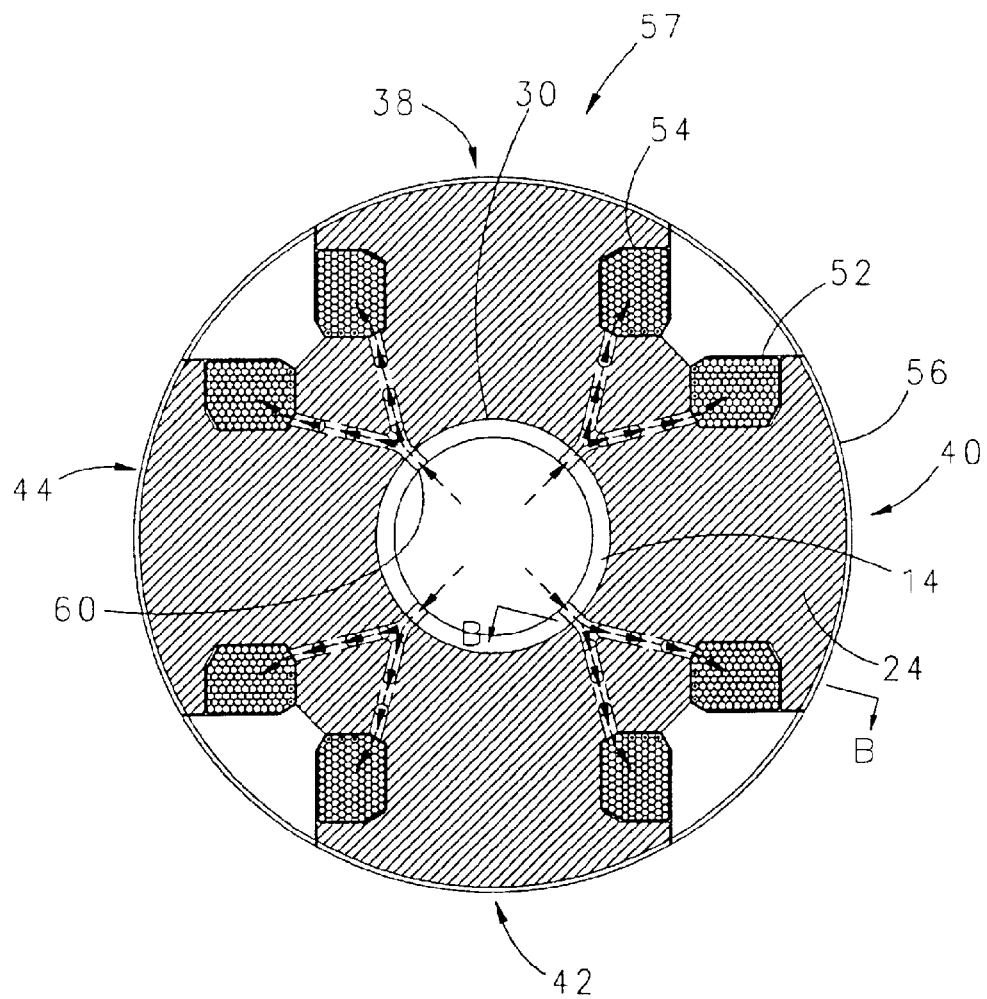
FIG. 3 is a transverse cross-sectional view of the rotor of FIG. 3 taken along the lines A—A of FIG. 1.

Referring to FIG. 3, the rotor core 24 is integral with and surrounds the hollow shaft 14. A main field winding 52 extends axially along recesses 54 in a portion of the core 24. The periphery of the core 24 is surrounded by a sleeve 56. The winding 52 comprises a plurality of coils of wire, forming poles. As in known generators, the rotor 57 comprises the rotor core 24, the sleeve 56, the winding 52, an exciter armature winding (not shown) and one or more permanent magnets (not shown). Rectified current is supplied to the main field winding 52 via the exciter generator. The output power of the generator 10 is generated in a stator winding 58 in the stator 12 in response to the rotating magnetic field produced by the main field winding 52.

Referring back to FIG. 1, cooling fluid, for example, a liquid or a chilled gas, is supplied to an end region 40 of the hollow shaft 14 through the fluid inlet 16. The cooling fluid passes along a flow path, as shown by the arrows, through the hollow shaft 14. A portion of the fluid passes through orifices 59, 61 in the shaft 14 and cools the ends of the rotor. To reduce potential hot spots elsewhere, cooling paths are created along the rotor core 24. In the generator of FIG. 1, an additional cooling path 60 is added at the axial midpoint of the rotor core, but as is set forth, multiple cooling paths may be inserted along the rotor core axis, depending on the rotor length and the temperature gradient.

Figure 4:
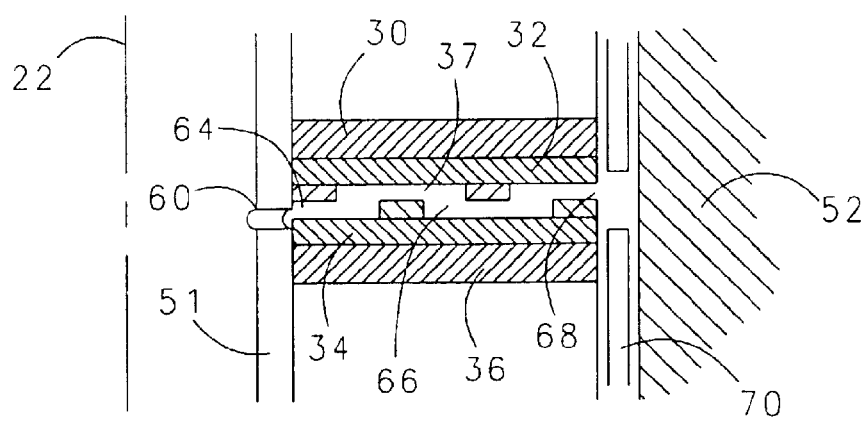
FIG. 4 is a longitudinal cross-sectional view taken along the lines B—B of FIG. 3.

Referring to FIG. 4, a radial orifice 60 in the shaft 14 allows the cooling fluid to reach the sandwich of perforated laminations 32, 34. Slots 37 in laminations 32, 34 form an entry 64 for the fluid that cooperates with the radial orifice 60. Laminations 32, 34 define a generally zigzag radial path 66, and an outlet 68, the outlet being arranged to discharge the fluid onto a region of the main field winding 52. An insulator 70 separates the winding 52 from the rotor core 24.

Because the zigzag cooling path approach of the present invention requires only relatively small slots 37 in the laminations 32, 34, the structural integrity of the rotor core is increased as compared with a rotor core having a straight passageway or slot that traverses the entire radius of the rotor core. The zigzag approach also allows the use of common laminations 30, 36 and 32, 34, each of which has a thickness less than the size of the passageway 66. A straight hole of a relatively small diameter compared with the (radial) length would be comparatively difficult to manufacture. A straight hole in a thin lamination would also require that the lamination be made in a number of pieces. The pieces then would be required to be contained radially. The "zigzag" passage approach of the present invention allows a rotor core 24 to be made of a stack of thin laminations that has comparatively strong structural capability.

In use, rotation of the rotor causes the cooling fluid to be forced outwardly by centrifugal force through the zigzag radial path 66. When the fluid exits the outlet 68, it ceases to follow a zigzag direction, and resumes a radial flow under centrifugal force. The fluid passes through the main field winding 52, thereby cooling it. Then the fluid, confined by the sleeve 56, moves axially toward the end regions of the rotor 57.

In another embodiment of the generator 10, the bonded laminations 30, 32, 34, 36 alone comprise a rotor core; no shaft is used. The cooling fluid passes through the central space in the rotor core formed by the voids 72 (FIG. 2). The radii of the voids 72 may be made to vary slightly from each other, so that the edges of the voids 72 in the rotor core stack form a cascading path for the cooling fluid, which increases the heat transfer.

It should be apparent to one of ordinary skill in the art from the teachings herein that the rotary electric machine 10 of the present invention may also be operated as a motor, particularly a synchronous motor. In that embodiment, the stator winding 58 is a polyphase winding that carries the main line current that powers the motor. The main field winding 52 receives DC excitation current from a rectifier assembly. When the motor attains full speed, the rotor rotates at a constant speed determined by the frequency of the main line current. The permanent magnets are not needed in the motor embodiment.

One with ordinary skill in the art may understand that the cooling principle of the present invention may be utilized in any rotary electric machine. The cooling laminations may be added at any number of places on the rotor core. The invention may be used in aircraft or land-based applications. Any cooling fluid, liquid or gas, may be used. The rotor core laminations may be made in various thicknesses and of various materials, and the rotor core may be made in any length. Any prime mover may power the invention when it is embodied as a generator, and any electrical load may be powered by the generator. Likewise, any electrical current source may power the invention when it is embodied as a motor, and the motor may supply torque to any device.

All of the foregoing changes are irrelevant. It suffices for the present invention that a rotary electric machine comprises a stator having a plurality of windings and a hollow shaft having an axial end region. The shaft is mounted within the stator for rotation about an axis. The shaft has at least one radial orifice and an inlet for a cooling fluid in the axial end region. A rotor core is integral to and coaxial with the hollow shaft, the rotor core having at least one electromagnetic device formed integral therewith. Each electromagnetic device is disposed in apposition to one of the plurality of stator windings. A generally radial outward passageway through the rotor core has an entry for the cooling fluid at the inner diameter of the core, the entry being aligned with one of the shaft radial orifices. The passageway has an outlet arranged to discharge the cooling fluid onto at least one of the electromagnetic devices.

I claim:

1. A rotary electric machine, comprising:

a stator having a plurality of windings;

a hollow shaft having an axial end region, the shaft being mounted within the stator for rotation about an axis, the shaft further having at least one radial orifice;

an inlet for a cooling fluid in the axial end region of the shaft;

a rotor core integral to and coaxial with the hollow shaft, the rotor core having at least one electromagnetic device formed integral therewith, each electromagnetic device being disposed in apposition to one of the plurality of stator windings, wherein the rotor core further comprises a plurality of laminations, at least one pair of adjacent laminations having periodic slots, wherein the pair of adjacent laminations comprises two laminations having an identical pattern of slots, the two lamination being rotated a number of degrees from each other and sandwiched between a pair of laminations without slots, such that the slots in the adjacent laminations form a continuous, zigzag, generally radial outward passageway; and a generally radial outward passageway through the rotor core, wherein the passageway has an entry for the cooling fluid at the inner diameter of the core, the entry being aligned with one of the shaft radial orifices, and the passageway further having an outlet, the outlet being arranged to discharge the cooling fluid onto at least one of the electromagnetic devices.

2. A rotary electric machine, comprising:

a stator having a plurality of windings;

a rotor core integral being mounted within the stator for rotation about an axis, the rotor core having at least one electromagnetic device formed integral therewith, each of the electromagnetic devices being disposed in apposition to one of the plurality of stator windings, wherein the rotor core further comprises a plurality of laminations, at least one pair of adjacent laminations having periodic slots, wherein the pair of adjacent laminations comprises two laminations having an identical pattern of slots, the two lamination being rotated a number of degrees from each other and sandwiched between a pair of laminations without slots, such that the slots in the adjacent laminations form a continuous, zigzag, generally radial outward passageway;

an inlet for a cooling fluid in an axial end region of the rotor core, and a generally radial outward passageway through the rotor core, wherein the passageway has an entry for the cooling fluid at the inner diameter of the rotor core, the passageway further having an outlet, the outlet being arranged to discharge the cooling fluid onto at least one of the electromagnetic devices.

\* \* \* \* \*